A. SCHWARZ.
Traveling Caps.

No. 8,508. Reissued Nov. 26, 1878.

Witnesses
Otto Hufeland.
Wm Mille

Inventor
Adolph Schwarz.
by
Van Santvoord & Hauff,
his attorneys.

UNITED STATES PATENT OFFICE.

ADOLPH SCHWARZ, OF NEW YORK, N. Y.

IMPROVEMENT IN TRAVELING-CAPS.

Specification forming part of Letters Patent No. 160,844, dated March 16, 1875; Reissue No. 8,508, dated November 26, 1878; application filed November 15, 1878.

*To all whom it may concern:*

Be it known that I, ADOLPH SCHWARZ, of the city, county, and State of New York, have invented a new and useful Improvement in Traveling-Caps, which improvement is fully set forth in the following specification, reference being had to the accompanying drawing, in which—

Figure 1:
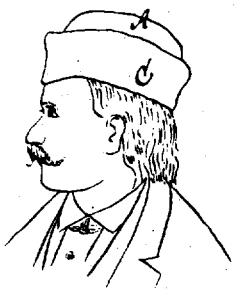
Figure 2:
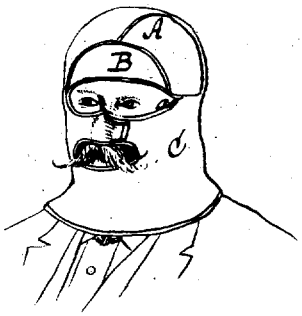

Figure 1 shows my cap as it appears when the cape is folded up. Fig. 2 shows the same when the cape is unfolded.

Similar letters indicate corresponding parts.

My invention relates to an improvement in that class of traveling-caps which may be arranged in different forms, according to the fancy of the wearer or the state of the weather, as hereinafter fully described.

In the drawing, the letter A designates the body of a cap, to which is attached a peak, B, capable of being turned up or down. C is a cape, which is secured to the lower edge of the cap-body A, and which is intended to be folded up around the lower part of the cap-body when not in use, to form a band, as shown by *c* in Fig. 1, and lowered or suspended therefrom in cold or inclement weather, as indicated in Fig. 2. This cape C extends entirely around the cap-body A, and its vertical edges are permanently closed or fastened together on the rear part of the cap-body, so that the cape is practically continuous in every direction. This arrangement of the cape does not interfere with its being folded up outside of the cap-body, and materially enhances its serviceability.

In the front part of the cape C is formed a face-opening, *a*, to enable one to see and breathe, this opening being separated in two divisions—one for the eyes and the other for the mouth—by a cross-band, D. The object of the cross-band D is to cover one's cheeks and nose, and it obviously adds to the comfort of the cape; but in case a single opening is desired for the eyes or any other portion of the face the same is omitted.

I am aware that caps have been made with capes opening in front and folding within the cap-body. Such I do not claim; but

What I claim as new, and desire to secure by Letters Patent, is—

The cap-body A, having an attached, closed, or continuous cape, C, provided with one or more openings for the eyes or any other portion of the face, said cape being adapted to be folded up to form the band, substantially as shown and described.

In testimony that I claim the foregoing I hereunto set my hand and seal this 12th day of November, 1878.

ADOLPH SCHWARZ. [L. S.]

Witnesses:
W. HAUFF,
E. F. KASTENHUBER.